US012704753B2

(12) United States Patent
Hagihara

(10) Patent No.: US 12,704,753 B2
(45) Date of Patent: Aug. 11, 2026

(54) BACKLIGHT DEVICE AND DISPLAY APPARATUS

(71) Applicant: Sharp Display Technology Corporation, Kameyama City (JP)

(72) Inventor: Satsuki Hagihara, Kameyama City (JP)

(73) Assignee: Sharp Display Technology Corporation, Ksmeyama City (JP)

( * ) Notice: Subject to any disclaimer, the term of this patent is extended or adjusted under 35 U.S.C. 154(b) by 0 days.

(21) Appl. No.: 19/257,768

(22) Filed: Jul. 2, 2025

(65) Prior Publication Data

US 2026/0010034 A1 Jan. 8, 2026

(30) Foreign Application Priority Data

Jul. 4, 2024 (JP) ................................ 2024-107933

(51) Int. Cl.
*G02F 1/13357* (2006.01)

(52) U.S. Cl.
CPC .. *G02F 1/133608* (2013.01); *G02F 1/133603* (2013.01); *G02F 1/133605* (2013.01); *G02F 1/133606* (2013.01); *G02F 1/133617* (2013.01)

(58) Field of Classification Search
CPC ......... G02F 1/133608; G02F 1/133603; G02F 1/133605; G02F 1/133611
See application file for complete search history.

(56) References Cited

U.S. PATENT DOCUMENTS

2008/0211989 A1* 9/2008 Park ..................... F21V 21/005 349/64
2012/0307489 A1* 12/2012 Park ..................... F21V 21/005 362/246
2015/0300576 A1* 10/2015 Matsuura .......... G02F 1/133603 362/235
2018/0023784 A1 1/2018 Tamura et al.
2018/0107067 A1* 4/2018 Yamano .................... F21S 2/00
2018/0341151 A1* 11/2018 Kurita ............... G02F 1/133608
2019/0146277 A1 5/2019 Ajichi
2019/0211996 A1 7/2019 Tamura et al.
2019/0285246 A1* 9/2019 Yamamoto ................ F21V 7/05
2020/0278103 A1 9/2020 Tamura et al.
2021/0317971 A1 10/2021 Tamura et al.

FOREIGN PATENT DOCUMENTS

JP 2018022683 A 2/2018
WO 2017191714 A1 11/2017

* cited by examiner

*Primary Examiner* — William N Harris

(74) *Attorney, Agent, or Firm* — ScienBiziP, P.C.

(57) ABSTRACT

A backlight device includes light-emitting elements, supported by a substrate, that emit excitation light, a first phosphor layer containing a phosphor that produces fluorescence upon receiving the excitation light, and a partitioning member forming spaces each of which accommodates any one or more of the light-emitting elements between the substrate and the first phosphor layer. The partitioning member includes walls each of which, in a top view, encloses the one or more of the light-emitting elements accommodated in each space, apices each of which connects ones of the walls that are adjacent to each other, one or more first through-holes formed in the walls, and one or more second through-holes formed in the apices. An air gap is formed between adjacent two walls by the two walls and one of the apices that connects them. The second through-hole communicates with the first through-hole via the air gap.

16 Claims, 9 Drawing Sheets

100A1
10
10r
34
30
32
24
50A1
28
44
THa
42
40A
46
21a
21
21b
22(on)
Vu
AS
THb
22(off)
z
y
x 42(m, n)
40A
41y
41x
42(m, n+1)
THa
41y
41x
THb
46
21p
44y
21
21r
THc
Vu(m, n)
Vu(m, n+1)
44x
THb
41y
41x
42(m+1, n)
z
y
x

BACKLIGHT DEVICE AND DISPLAY APPARATUS

BACKGROUND

1. Field

The present disclosure relates to a backlight device and a display apparatus.

2. Description of the Related Art

Many a liquid crystal display apparatus includes a backlight device including a plurality of light sources (e.g. a plurality of LEDs). As a backlight device that a liquid crystal display apparatus includes, for example, a remote phosphor white LED device obtained by combining a light source that emits blue light (e.g. a blue LED), a green phosphor placed at a distance from the light source, and a red phosphor placed at a distance from the light source is used.

A plurality of LEDs that a backlight device has may, for example, be divided into a plurality of areas so that only LEDs belonging to an area needing illuminating light may glow or so that desired luminance adjustments may be made for each separate area. Such a driving method is called "partial driving", "divided driving", "area driving" or "local dimming". Driving a backlight device by a divided driving method makes it possible to bring about improvement in contrast ratio in luminance between a bright section and a dark section of a display apparatus including such a backlight device.

Backlight devices are grouped into edge-lit backlight devices and direct-lit backlight devices according to a positional relationship between a light extraction surface and a light source. When a direct-lit remote phosphor backlight device is being partially driven, light from a glowing area in which LEDs are glowing may fall on a non-glowing area in which LEDs are off. For an improved contrast ratio between a glowing area and a non-glowing area adjacent to the glowing area, a member that separates LEDs into unit areas may be provided. Japanese Unexamined Patent Application Publication No. 2018-22683 discloses a surface-emitting device having a partitioning member provided so as to surround each of the light sources. International Publication No. 2017/191714 discloses a backlight device having a reflection partition wall provided so as to surround an LED unit formed from one or more blue LEDs.

Providing a backlight device having a plurality of light sources with a partitioning member that separates the plurality of light sources into unit areas may cause luminance unevenness to occur due to a local reduction in luminance near the partitioning member. Details will be described later.

It is desirable to provide a novel backlight device that makes it possible to suppress luminance unevenness and a display apparatus including such a backlight device.

SUMMARY

According to an aspect of the disclosure, there is provided a backlight device including a substrate having a principal surface, a plurality of light-emitting elements, supported by the principal surface of the substrate, that emit excitation light, a first phosphor layer containing a phosphor that produces fluorescence upon receiving the excitation light, and a partitioning member forming a plurality of spaces each of which accommodates any one or more of the plurality of light-emitting elements between the principal surface of the substrate and the first phosphor layer. The partitioning member includes a plurality of walls each of which, in a top view, encloses the one or more of the plurality of light-emitting elements accommodated separately in each of the plurality of spaces, a plurality of apices each of which connects ones of the plurality of walls that are adjacent to each other, one or more first through-holes formed in the plurality of walls, and one or more second through-holes formed in the plurality of apices. An air gap is formed between adjacent two walls of the plurality of walls by the two walls and one of the apices that connects the two walls. A second through-hole formed in the one of the apices among the one or more second through-holes communicates with a first through-hole formed in one of the two walls among the one or more first through-holes via the air gap.

According to an aspect of the disclosure, there is provided a display apparatus including a display panel and the backlight device. The backlight device emits light toward a back face of the display panel.

DESCRIPTION OF THE EMBODIMENTS

The following describes embodiments of the present disclosure with reference to the drawings. The present disclosure is not limited to the following embodiments. In the following drawings, constituent elements having substantially the same functions are given common reference signs, and a description of such constituent elements may be omitted. For reference, the drawings may indicate an x direction, a y direction, and a z direction that are orthogonal to one another.

Embodiment 1

Figure 1A:
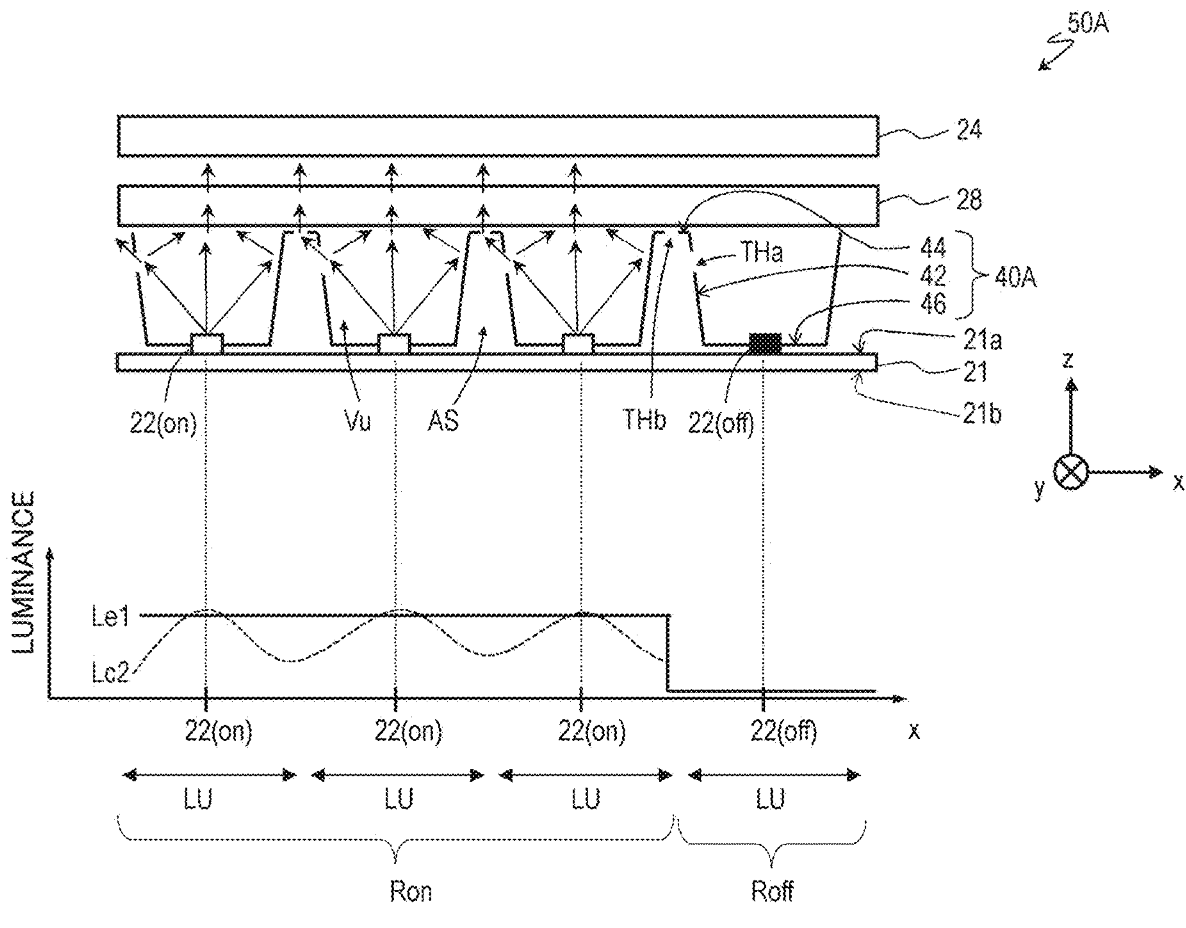
FIG. 1A illustrates a cross-sectional view (upper section) schematically showing a backlight device according to Embodiment 1 of the present disclosure and a diagram (lower section) schematically showing a luminance Le1 attained when the backlight device is being partially driven.

A backlight device 50A according to the present embodiment is described with reference to FIG. 1A. The upper section of FIG. 1A is a cross-sectional view schematically showing the backlight device 50A according to Embodiment 1, and the lower section of FIG. 1A is a diagram schematically showing a luminance Le1 attained when the backlight device 50A is being partially driven.

The backlight device 50A includes a substrate 21, a plurality of light-emitting elements 22, a phosphor layer 24 (sometimes referred to as "first phosphor layer"), and a partitioning member 40A.

The substrate 21 has a principal surface 21*a* and another principal surface 21*b* that faces away from the principal surface 21*a*.

Figure 2:
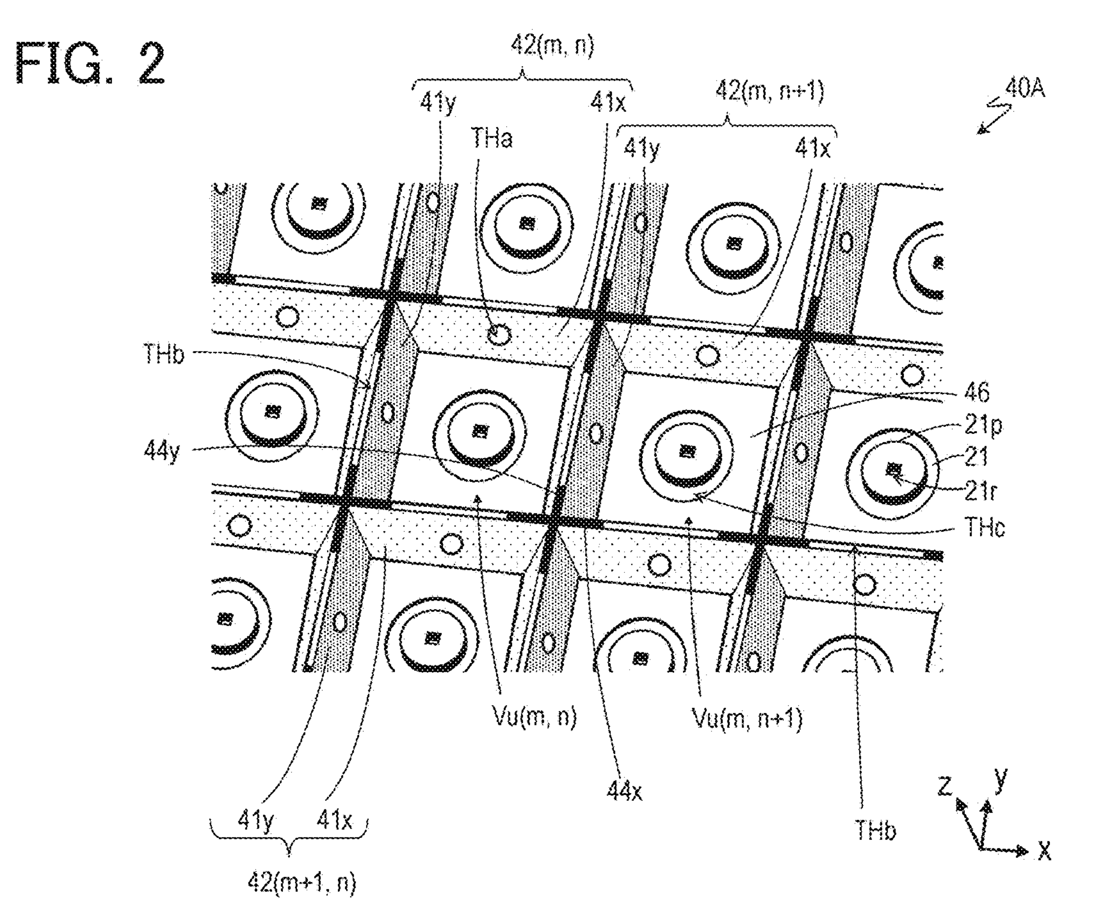
FIG. 2 is a perspective view schematically showing a partitioning member of a backlight device.
Figure 3:
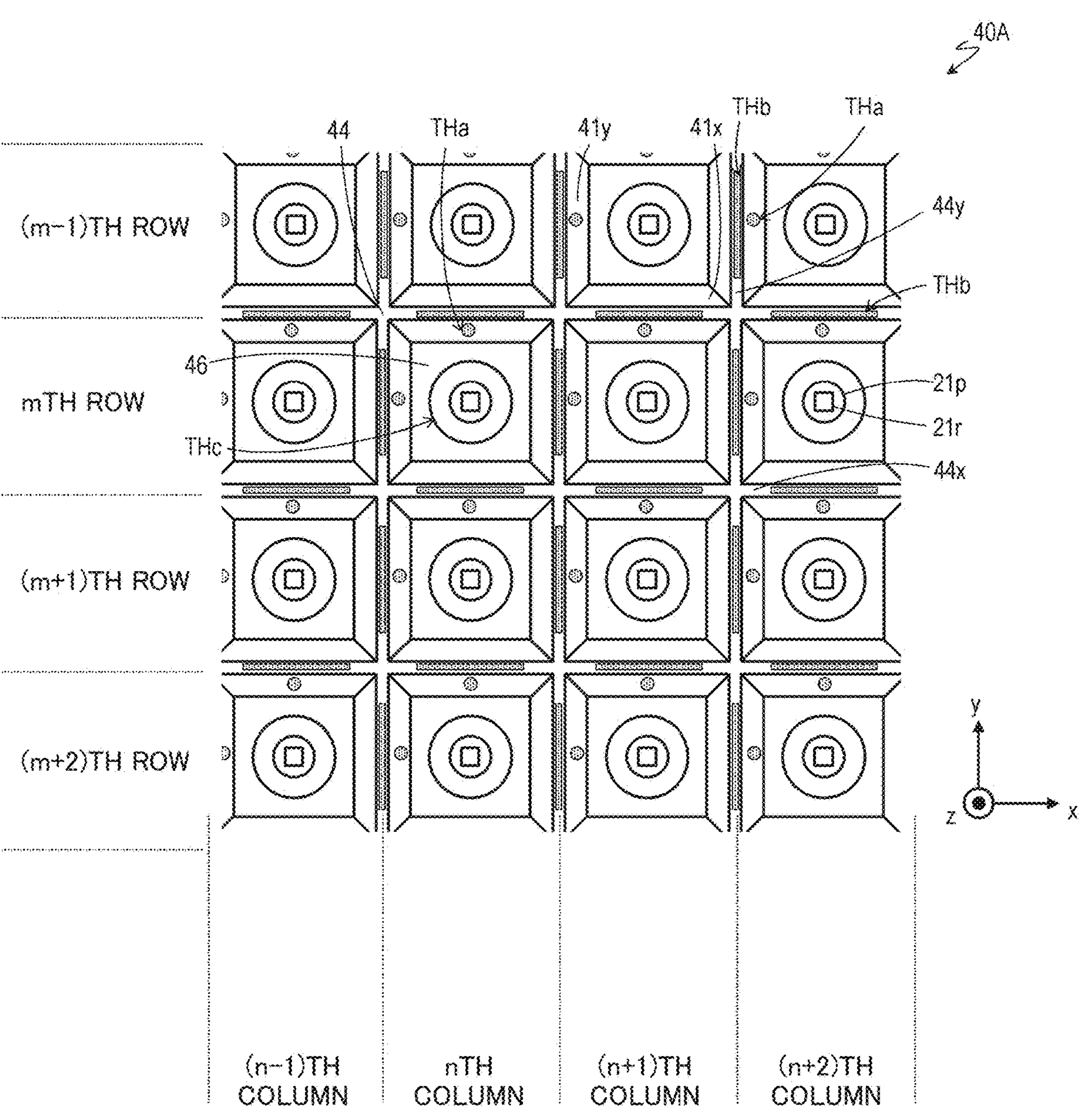
FIG. 3 is a top view schematically showing the partitioning member.

The plurality of light-emitting elements 22 are supported by the principal surface 21*a* of the substrate 21. As shown in FIGS. 2 and 3, which will be described later, the plurality of light-emitting elements 22 are, for example, two-dimensionally arrayed on the principal surface 21*a* of the substrate 21. The plurality of light-emitting elements 22 may be one-dimensionally arrayed on the principal surface 21*a* of the substrate 21. The plurality of light-emitting elements 22 emit excitation light that excites a phosphor contained in the phosphor layer 24. The excitation light emitted by the light-emitting elements 22 contains, for example, blue light. The light-emitting elements 22 are, for example, blue LEDs that emit blue light. The light-emitting elements 22 may be white LEDs that emit white light.

FIG. 1A schematically shows how the backlight device 50A is being partially driven, with light-emitting elements 22 that are glowing (i.e. emitting the excitation light) being denoted by reference sign "(on)" and a light-emitting element 22 that is not glowing (i.e. not emitting the excitation light) being denoted by reference sign "(off)". Furthermore, FIG. 1A uses arrows to schematically indicate paths of the excitation light emitted from the light-emitting elements 22 (on) that are glowing.

The phosphor layer 24 contains a phosphor that produces fluorescence by being excited upon receiving the excitation light emitted from the plurality of light-emitting elements 22. The phosphor layer 24 is placed beside the principal surface 21*a* of the substrate 21. Light produced by a phosphor is herein sometimes referred to as "fluorescence". Unless otherwise noted, the "fluorescence" encompasses narrowly defined fluorescence and phosphorescence. For example, in a case where the light-emitting elements 22 emit blue light, the phosphor layer 24 contains a green phosphor that produces green fluorescence and/or a red phosphor that produces red fluorescence. In addition to a green phosphor and/or a red phosphor or instead of a green phosphor and/or a red phosphor, the phosphor layer 24 may contain a yellow phosphor that produces yellow fluorescence. From a point of view of attaining high color rendering properties, it is preferable that the phosphor layer 24 contain a green phosphor that produces green fluorescence and a red phosphor that produces red fluorescence. The phosphor layer 24 may contain, for example, a quantum-dot green phosphor that produces green fluorescence and/or a quantum-dot red phosphor that produces red fluorescence. A quantum-dot phosphor generally has the advantage of being narrow in half-value width of a peak wavelength of an emission spectrum and being high in color purity and therefore appears promising to satisfy, for example, the UHD Premium standard (color reproducibility BT2020 standard 90% or higher, HDR10 standard). Alternatively, a publicly known phosphor such as a red sulfide phosphor (e.g. a calcium sulfide phosphor) and a green sulfide phosphor (e.g. a thiogallate phosphor) may be used. A protective layer(s) may be provided on both sides or one side of the phosphor layer 24.

The backlight device 50A is a remote phosphor backlight configured such that the light-emitting elements 22 and the phosphor layer 24, which produces fluorescence upon receiving the excitation light emitted from the light-emitting elements 22, are placed at a distance from each other. Since the phosphor layer 24 is placed at a distance from the light-emitting elements 22, a phosphor of the phosphor layer 24 can be inhibited from deteriorating due to heat produced by the light-emitting elements 22.

The partitioning member 40A forms a plurality of spaces Vu each of which accommodates any one or more of the plurality of light-emitting elements 22 between the principal surface 21*a* of the substrate 21 and the phosphor layer 24. Although, in the illustrated example, one light-emitting element 22 is accommodated in each of the plurality of spaces Vu, two or more light-emitting elements 22 may be accommodated in each of the spaces Vu. The backlight device 50A can be partially driven with one or more light-emitting elements 22 accommodated in each of the spaces Vu being a unit. When the backlight device 50A is seen from a direction normal to the principal surface 21*a* of the substrate 21, areas corresponding separately to each of the spaces Vu may be referred to as "unit areas LU". That is, it can also be said that the backlight device 50A can be partially driven with one or more light-emitting elements 22 included in each of the unit areas LU being a unit. In the partial driving, a light-emitting face of the backlight device 50A is divided into a plurality of light-emitting areas with the unit areas LU being units, and the turning on and turning off of the light-emitting elements 22 in the plurality of light-emitting areas can be individually controlled. When the backlight device 50A is being partially driven, the plurality of light-emitting elements 22 include light-emitting elements 22 (*on*) that are glowing and a light-emitting element 22 (off) that is not glowing, and the light-emitting surface of the backlight device 50A includes a glowing area Ron and a non-glowing area Roff.

The partitioning member 40A includes a plurality of walls 42 each of which, in a top view (i.e. when seen from a direction normal to the principal surface 21*a* of the substrate 21), encloses a corresponding one of the light-emitting elements 22 accommodated separately in each of the plurality of spaces Vu and a plurality of apices 44 each of which connects ones of the plurality of walls 42 that are adjacent to each other. The plurality of walls 42 are provided separately in correspondences with each of the plurality of spaces Vu. It can also be said that the plurality of walls 42 are provided separately in correspondence with each of the unit areas LU. For example, the unit areas LU are two-dimensionally arrayed in a top view, and accordingly, the walls 42 are two-dimensionally arrayed in a top view. In a case where the unit areas LU are one-dimensionally arrayed in a top view, the walls 42 are one-dimensionally arrayed in a top view.

Each of the plurality of apices 44 is provided between two of the plurality of walls 42 that are adjacent to each other. The apices 44 include flat portions that are substantially parallel to the principal surface 21*a* of the substrate 21. In a case where the unit areas LU and the walls 42 are two-dimensionally arrayed in a top view, the plurality of apices 44 can be formed in a grid pattern in a top view.

Two of the plurality of walls 42 that are adjacent to each other are separated by an air gap AS formed by these two walls 42 and one of the apices 44 that connects these two walls 42. The partitioning member 40A further includes one or more first through-holes THa formed in the plurality of walls 42 and one or more second through-holes THb formed in the plurality of apices 44. The second through-holes THb communicate with the first through-holes THa via the air gap AS.

The backlight device 50A may further include a diffuser panel 28 placed between the phosphor layer 24 and the partitioning member 40A. The diffuser panel 28 can be omitted. A portion of the excitation light emitted from the light-emitting elements 22 that has passed through the diffuser panel 28 can fall on the phosphor layer 24.

As will be described below, the backlight device 50A can suppress luminance unevenness by having the partitioning member 40A.

Figure 9:
FIG. 9 illustrates a cross-sectional view (upper section) schematically showing a backlight device according to Comparative Example 1 and a diagram (lower section) schematically showing a luminance Lc1 attained when the backlight device is being partially driven.
Figure 9:
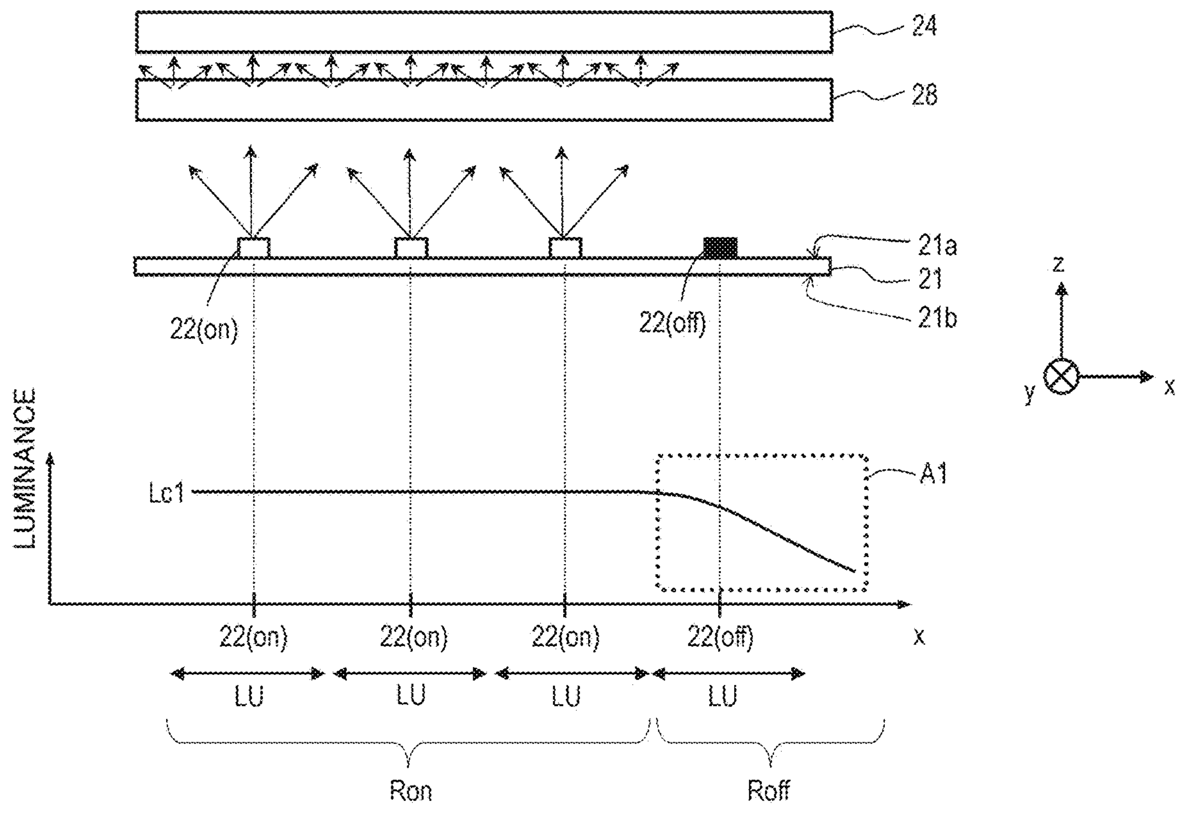
Figure 10:
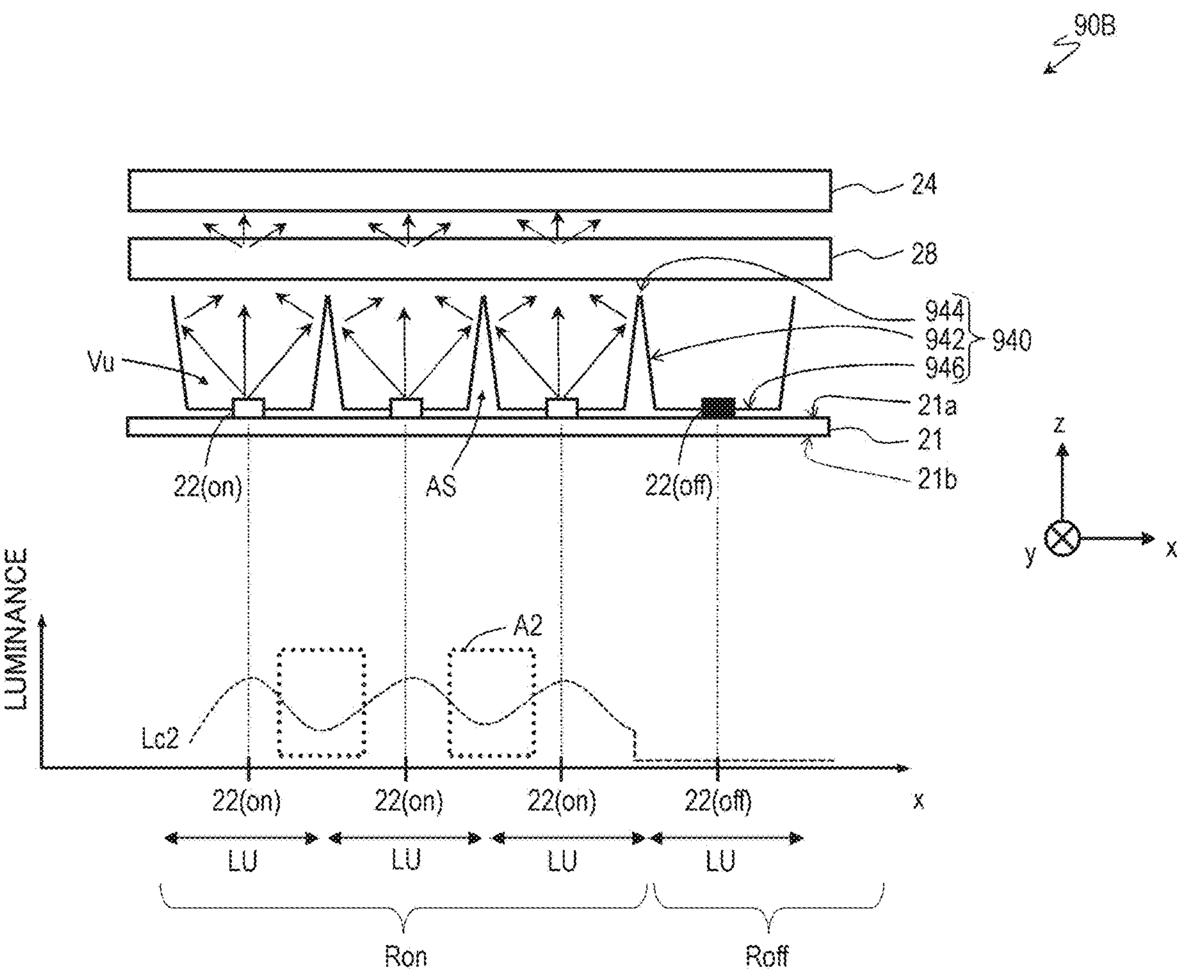
FIG. 10 illustrates a cross-sectional view (upper section) schematically showing a backlight device according to Comparative Example 2 and a diagram (lower section) schematically showing a luminance Lc2 attained when the backlight device is being partially driven.

The ability of the backlight device 50A to suppress luminance unevenness is described in comparison with backlight devices of comparative examples shown in FIGS. 9 and 10. The upper section of FIG. 9 is a cross-sectional view schematically showing a backlight device 90A according to Comparative Example 1, and the lower section of FIG. 9 is a diagram schematically showing a luminance Lc1 attained when the backlight device 90A according to Comparative Example 1 is being partially driven. The upper section of FIG. 10 is a cross-sectional view schematically showing a backlight device 90B according to Comparative Example 2, and the lower section of FIG. 10 is a diagram schematically showing a luminance Lc2 attained when the backlight device 90B according to Comparative Example 2 is being partially driven. A description of matters that the backlight device 90A of Comparative Example 1 and the backlight device 90B of Comparative Example 2 have in common with the backlight device 50A may be omitted.

The backlight device 90A of Comparative Example 1 differs from the backlight device 50A of the present embodiment in that the backlight device 90A of Comparative Example 1 does not include a partitioning member 40A. The backlight device 90B of Comparative Example 2 differs from the backlight device 50A of the present embodiment in that the backlight device 90B of Comparative Example 2 includes a partitioning member 940 instead of the partitioning member 40A. First, the workings and effects of the partitioning member 940 are described by making a comparison between the backlight device 90A of Comparative Example 1 and the backlight device 90B of Comparative Example 2.

When being partially driven, the backlight device 90A of Comparative Example 1 shown in FIG. 9, which does not include a partitioning member, allows excitation light emitted from light-emitting elements 22 (*on*) that are glowing to fall on part of the non-glowing area Roff that is close to the glowing area Ron. This results in a reduction in contrast ratio in luminance between the glowing area Ron and the non-glowing area Roff. From the point of view of the display quality of a display apparatus including the backlight device 90A, it is preferable that the luminance of the non-glowing area Roff be as low as possible; however, for example, as indicated by a portion A1 surrounded by a dotted quadrangle in the lower section of FIG. 9, a sufficiently low luminance may not be attained in part of the non-glowing area Roff that is close to the glowing area Ron. In a display apparatus including such a backlight device 90A, there can occur a phenomenon (sometimes called "halo phenomenon") in which leakage of light into an area supposed to be darkly displayed causes a blurred display of the contours of a bright section.

On the other hand, the backlight device 90B of Comparative Example 2 shown in FIG. 10, which includes the partitioning member 940, has an improved contrast ratio at the boundary between the glowing area Ron and the non-glowing area Roff in comparison with the backlight device 90A of Comparative Example 1.

The partitioning member 940 differs from the partitioning member 40A of the backlight device 50A in that the partitioning member 940 does not include a first through-hole THa or a second through-hole THb. The partitioning member 940 includes a plurality of walls 942 each of which, in a top view, encloses a corresponding one of the light-emitting elements 22 accommodated separately in each of the plurality of spaces Vu. The plurality of walls 942 are provided separately in correspondences with each of the plurality of spaces Vu. That is, the plurality of walls 942 are provided separately in correspondence with each of the unit areas LU. Ones of the plurality of walls 942 that are adjacent to each other are connected by an apex 944. The partitioning member 940 further includes a plurality of bottom faces 946 provided over the principal surface 21*a* of the substrate 21 and each enclosed separately by each of the plurality of walls 942 in a top view.

For example, when one of two unit areas LU that are adjacent to each other is a glowing area Ron and the other is a non-glowing area Roff, the backlight device 90B of Comparative Example 2, which includes the partitioning member 940, can inhibit entry of light into the non-glowing area Roff. Accordingly, when partially driven, the backlight device 90B of Comparative Example 2 has an improved contrast ratio at the boundary between the glowing area Ron and the non-glowing area Roff.

However, in the backlight device 90B of Comparative Example 2, luminance unevenness can occur due to the partitioning member 940. For example, as indicated by a portion A2 surrounded by a dotted quadrangle in the lower section of FIG. 10, luminance unevenness occurs due to a local reduction in luminance between adjacent unit areas LU. For example, in a top view, local darkness appears along the shape of the apex 944 of the partitioning member 940. For example, in a case where the apex 944 is formed in a grid pattern in a top view, luminance unevenness is formed in a grid pattern.

On the other hand, as shown in FIG. 1A, by having the partitioning member 40A instead of the partitioning member 940, the backlight device 50A according to the present embodiment better reduces the occurrence of luminance unevenness than does the backlight device 90B of Comparative Example 2. The lower section of FIG. 1A shows the luminance Le1 attained when the backlight device 50A is being partially driven and the luminance Lc2 attained when the backlight device 90B of Comparative Example 2 is being partially driven. As schematically indicated by the arrows in the upper section of FIG. 1A, a portion of the light emitted from the light-emitting elements 22 accommodated separately in each of the spaces Vu that has entered the air gap AS through the first through-holes THa can be reflected off surfaces of the plurality of walls 42 that face the air gap AS, pass through the second through-holes THb, which communicate with the first through-holes THa, and fall on the phosphor layer 24 via the diffuser panel 28. The surfaces of the plurality of walls 42 that face the air gap AS have diffuse reflectiveness against the light emitted from the light-emitting elements 22. For example, at least the walls 42 of the partitioning member 40A are formed from a member having diffuse reflectiveness. It is preferable that the apices 44 as well as the walls 42 be formed from the member having diffuse reflectiveness. For example, the whole of the partitioning member 40A may be integrally formed from the member having diffuse reflectiveness. The member having diffuse reflectiveness can be formed, for example, using a resin material obtained by dispersing, in a base material, a material (such as particles and a pigment) differing in refractive index from the base material. The term "reflectiveness" (including diffuse reflectiveness and specular reflectiveness) herein means a reflectivity of 70% or higher at an emission peak wavelength of the light-emitting elements 22. It is preferable that the reflectivity at the emission peak wavelength of the light-emitting elements 22 be 80% or higher, more preferably 90% or higher.

By having the partitioning member 40A, the backlight device 50A allows the light falling on the phosphor layer 24 via the diffuser panel 28 to be extracted not only from each of the spaces Vu but also from the second through-holes THb provided in the apices 44, thus suppressing a local reduction in luminance between adjacent unit areas LU. Accordingly, the backlight device 50A has an improved contrast ratio at the boundary between the glowing area Ron and the non-glowing area Roff and, at the same time, better suppresses luminance unevenness attributed to a local reduction in luminance between adjacent unit areas LU than does the backlight device 90B of Comparative Example 2. A display apparatus including the backlight device 50A has improved display quality in comparison with a display apparatus including the backlight device 90B of Comparative Example 2.

Figure 11:
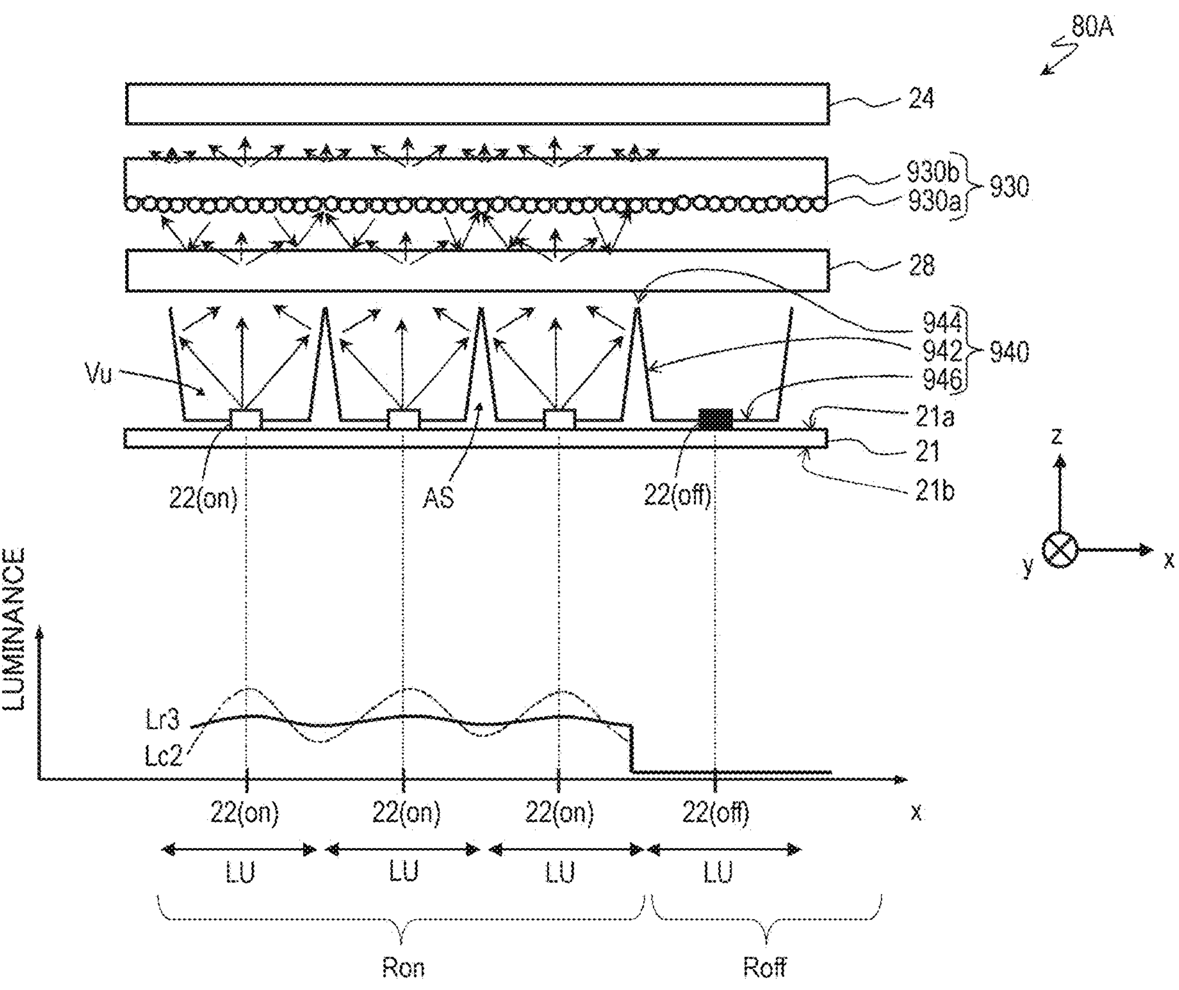
FIG. 11 illustrates a cross-sectional view (upper section) schematically showing a backlight device according to Reference Example and a diagram (lower section) schematically showing a luminance Lr3 attained when the backlight device is being partially driven.

FIG. 11 shows a backlight device 80A according to Reference Example. The upper section of FIG. 11 is a cross-sectional view schematically showing the backlight device 80A according to Reference Example, and the lower section of FIG. 11 is a diagram schematically showing a luminance Lr3 attained when the backlight device 80A according to Reference Example is being partially driven. The lower section of FIG. 11 shows the luminance Lr3 attained when the backlight device 80A according to Reference Example is being partially driven and the luminance Lc2 attained when the backlight device 90B of Comparative Example 2 is being partially driven.

The backlight device 80A according to Reference Example shown in FIG. 11 differs from the backlight device 90B of Comparative Example 2 in that the backlight device 80A according to Reference Example further includes a diffusion sheet 930. The diffusion sheet 930 is placed between the diffuser panel 28 and the phosphor layer 24. The diffusion sheet 930 includes a base film 930*a* and a light diffusion material (e.g. spherical beads) 930*b* applied onto the base film 930*a*. Diffuse reflection by the light diffusion material 930*b* of light emitted from the diffuser panel 28 suppresses luminance unevenness in a light extraction surface (x-y plane). The backlight device 80A according to Reference Example, which includes the diffusion sheet 930, better suppresses luminance unevenness attributed to a local reduction in luminance between adjacent unit areas LU than does the backlight device 90B of Comparative Example 2 but is overall lower in luminance of the glowing area Ron than the backlight device 90B of Comparative Example 2.

On the other hand, the backlight device 50A according to the present embodiment has the advantage of being able to better suppress an overall reduction in luminance and better suppress luminance unevenness attributed to a local reduction in luminance between adjacent unit areas LU than does the backlight device 80A according to Reference Example.

Modification

Figure 1B:
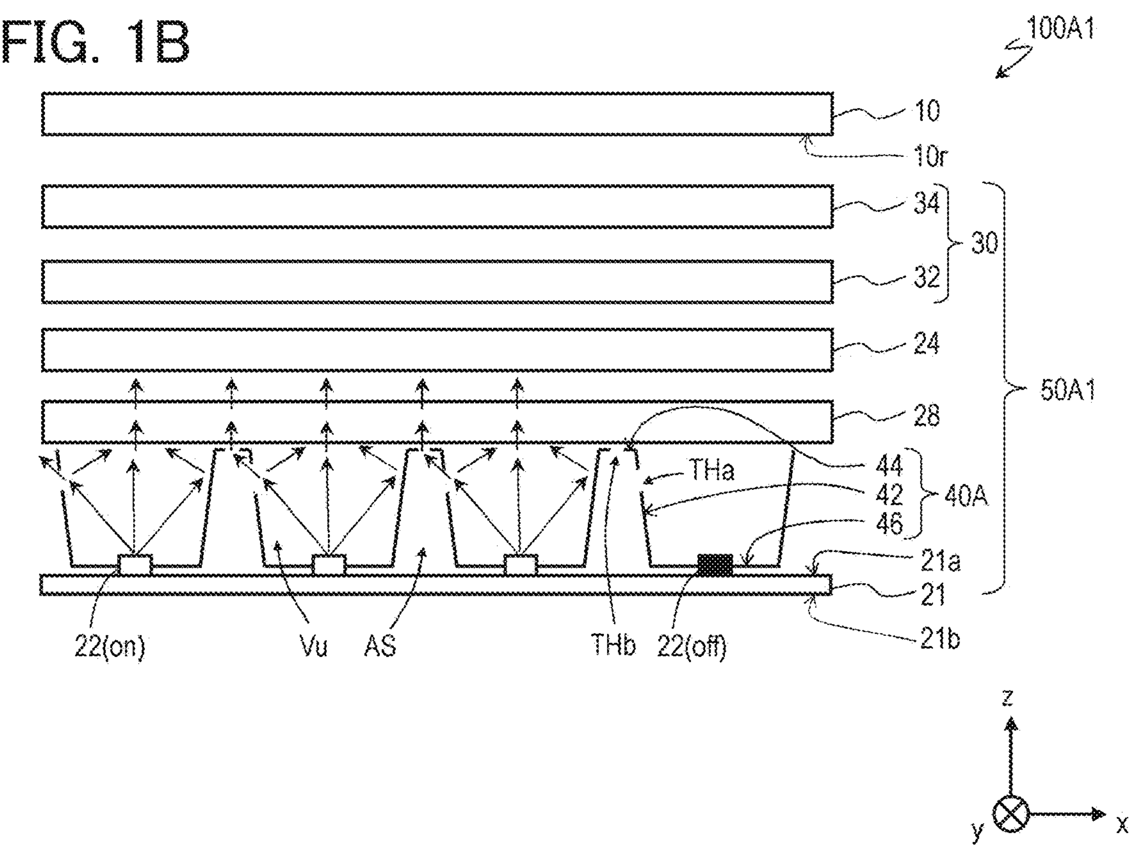
FIG. 1B is a cross-sectional view schematically showing a backlight device according to a modification of Embodiment 1 of the present disclosure and a liquid crystal display apparatus including the backlight device.

A backlight device 50A1 according to a modification of the present embodiment and a display apparatus 100A1 including the backlight device 50A1 are described with reference to FIG. 1B. FIG. 1B is a cross-sectional view schematically showing the backlight device 50A1 according to the modification of the present embodiment and the display apparatus 100A1 including the backlight device 50A1.

As shown in FIG. 1B, the backlight device 50A1 differs from the backlight device 50A in that the backlight device 50A1 further includes an optical layer stack 30 placed at a side of the phosphor layer 24 that faces away from the diffuser panel 28. The backlight device 50A1 can suppress luminance unevenness in the same manner as the backlight device 50A.

The optical layer stack 30 can include a plurality of optical sheets. The optical sheets included in the optical layer stack 30 can, for example, be publicly known prism sheets, microlens sheets, reflective linearly polarizing plates, or other sheets. The optical layer stack 30 may include two prism sheets placed so that the ridge lines of their respective prisms are substantially orthogonal to each other. Usable examples of reflective linearly polarizing plates include multilayer reflective polarizing plates (commercially available as "DBEF", which is registered trademark). In the illustrated example, the optical layer stack 30 includes a microlens sheet 32 and a reflective linearly polarizing plate 34 placed on top of the microlens sheet 32.

As shown in FIG. 1B, the display apparatus 100A1 includes a display panel (e.g. a liquid crystal display panel) 10 and the backlight device 50A1. In the display apparatus 100A1, the backlight device 50A1 emits light toward a back face 10*r* of the display panel 10. As with the display apparatus including the backlight device 50A, the display apparatus 100A1 reduces deterioration of display quality.

Partitioning Member 40A

An example of a structure of the partitioning member 40A is described in more detail with reference to FIGS. 2 and 3. FIGS. 2 and 3 are a perspective view and a top view, respectively, schematically showing the partitioning member 40A of the backlight device 50A.

In the example shown in FIGS. 2 and 3, the plurality of spaces Vu are two-dimensionally arrayed along a first direction (in the drawings, the x direction) and a second direction (in the drawings, the y direction) intersecting (in this example, substantially orthogonal to) the first direction in a top view. That is, the unit areas LU are two-dimensionally arrayed along the first direction and the second direction. In this example, the plurality of spaces Vu are arrayed in a matrix having a plurality of rows and a plurality of columns in a top view with the first direction being a row-wise direction and the second direction being a column-wise direction. A space Vu in the $m^{th}$ row and the nth column may be denoted as a space Vu (m, n), and a wall 42 provided in correspondence with the space Vu (m, n) may be denoted as a wall 42 (m, n).

Each of the plurality of walls 42 has a plurality of side faces 41 (in this example, four side faces 41) that, in a top view, enclose in a rectangle shape a corresponding one of the light-emitting elements 22 accommodated separately in each of the plurality of spaces Vu. In a top view, each of the walls 42 defines a rectangular space Vu having a first side extending in the first direction and a second side extending in the second direction. The plurality of side faces 41 of each of the walls 42 include a first side face 41*x* constituting the first side and a second side face 41*y* constituting the second side. The first side face 41*x* and the second side face 41*y* may be collectively referred to as "side faces 41".

Attention is paid to two of the plurality of walls 42 that are adjacent to each other in the first direction, e.g. the wall 42 (m, n) and a wall 42 (m, n+1). The wall 42 (m, n) and the wall 42 (m, n+1) have second side faces 41*y* that face each other via the air gap AS, one of which has a corresponding one of the first through-holes THa formed therein, and the other of which has none of the first through-holes THa formed therein. Providing first through-holes THa in both of the second side faces 41*y*, which face each other via the air gap AS, of two walls 42 that are adjacent to each other in the first direction may make it difficult to sufficiently bring about an effect of improving a contrast ratio at the boundary between the glowing area Ron and the non-glowing area Roff. Providing a first through-hole THa in only one of the second side faces 41*y*, which face each other via the air gap AS, of two walls 42 that are adjacent to each other in the first direction makes it possible to suppress luminance unevenness while improving a contrast ratio at the boundary between the glowing area Ron and the non-glowing area Roff.

The same may apply to two walls 42 that are adjacent to each other in the second direction. That is, with attention paid to two walls 42 that are adjacent to each other in the second direction, e.g. the wall 42 (m, n) and a wall 42 (m+1, n), the wall 42 (m, n) and the wall 42 (m+1, n) have first side faces 41*x* that face each other via the air gap AS, one of which has a corresponding one of the first through-holes THa formed therein, and the other of which has none of the first through-holes THa formed therein. Providing a first through-hole THa in only one of the first side faces 41*x*, which face each other via the air gap AS, of two walls 42 that are adjacent to each other in the second direction makes it possible to suppress luminance unevenness while improving a contrast ratio at the boundary between the glowing area Ron and the non-glowing area Roff.

The plurality of apices 44 include a plurality of first apices 44*x* extending in the first direction in a top view and a plurality of second apices 44*y* extending in the second direction in a top view. In the illustrated example, the plurality of apices 44 are formed in a grid pattern including the plurality of first apices 44*x* and the plurality of second apices 44*y* in a top view. Faces including the plurality of apices 44 may be integrally formed in succession.

The second through-holes THb are formed at or near points of intersection of the first apices 44*x* and the second apices 44*y*. The plurality of apices 44 may support the diffuser panel 28. For example, at least one or more of the plurality of apices 44 may be in contact with the diffuser panel 28. In a case where the second through-holes THb are formed at the points of intersection of the first apices 44*x* and the second apices 44*y*, a function with which for the plurality of apices 44 to support the diffuser panel 28 can be inhibited from deteriorating due to provision of the second through-holes THb.

The partitioning member 40A further includes the plurality of bottom faces 46 provided over the principal surface 21*a* of the substrate 21 and each enclosed separately by each of the plurality of walls 42 in a top view. The plurality of bottom faces 46 are provided separately in correspondence with each of the plurality of spaces Vu. In the illustrated example, each of the bottom faces 46 has a rectangular shape in a top view. The bottom faces 46 have third through-holes THc provided separately therein. Each of the light-emitting elements 22 accommodated separately in each of the spaces Vu is placed within a corresponding one of the third through-hole THc and provided so as to be exposed from a corresponding one of the bottom faces 46. In the illustrated example, projections 21*p* provided separately in correspondence with each of the third through-holes THc and recesses 21*r* in the projections 21*p* are provided over the principal surface 21*a* of the substrate 21, and each of the light-emitting elements 22 accommodated separately in each of the spaces Vu is placed within a corresponding one of the recesses 21*r*.

Figure 4A:
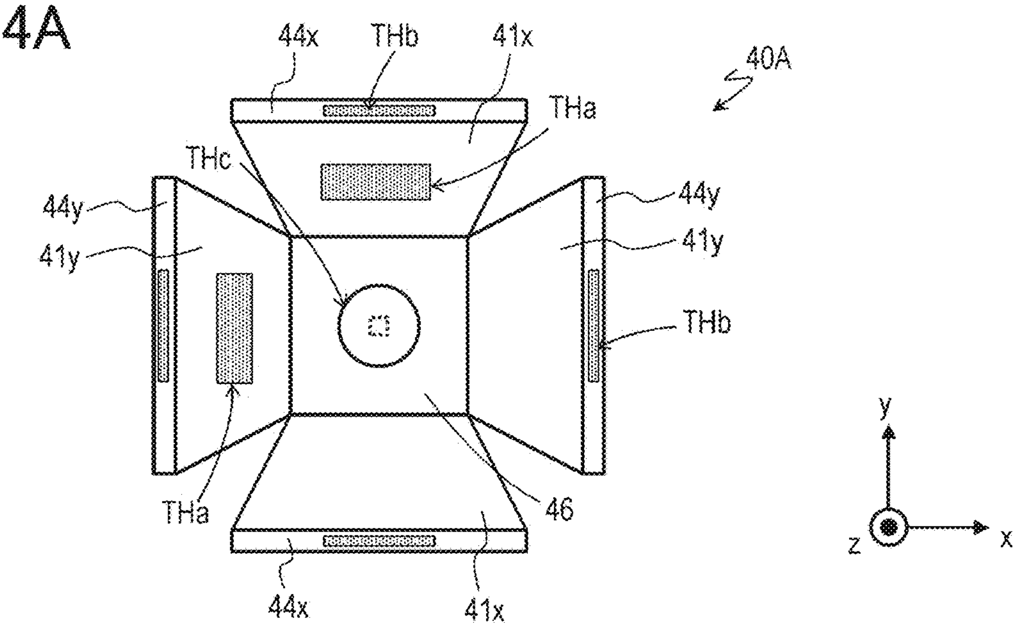
FIG. 4A is a schematic view for explaining a structure of the partitioning member.
Figure 4B:
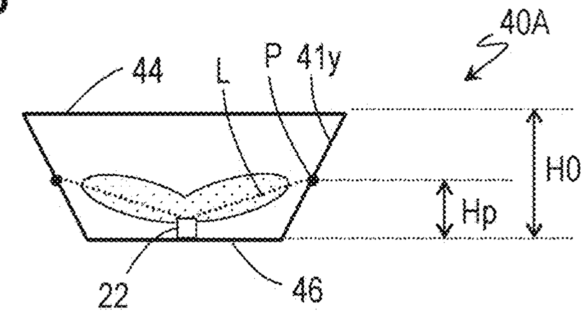
FIG. 4B is a schematic view for explaining the structure of the partitioning member.
Figure 4B:
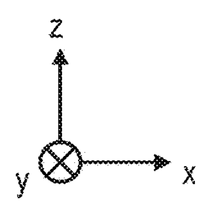
Figure 4C:
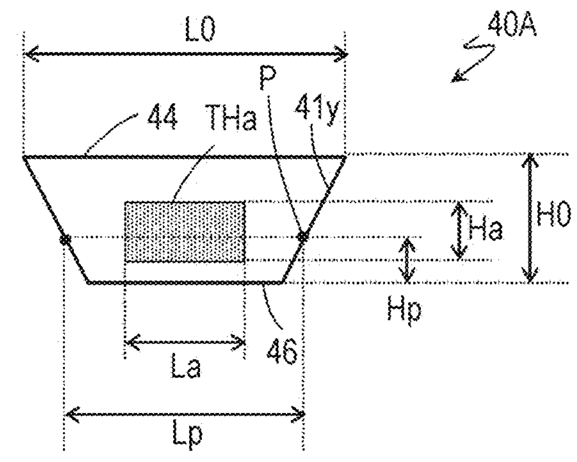
FIG. 4C is a schematic view for explaining the structure of the partitioning member.
Figure 4C:
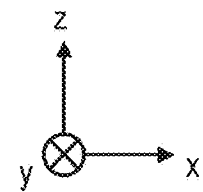
Figure 4D:
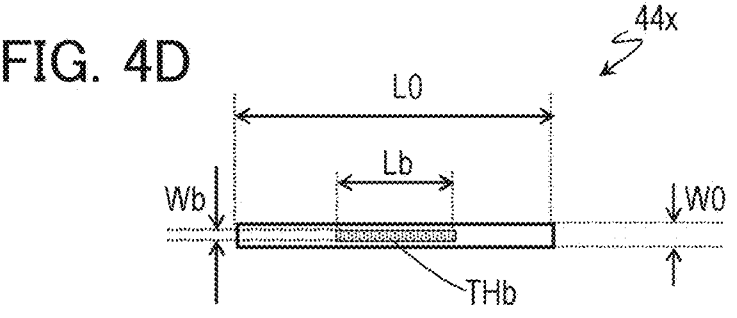
FIG. 4D is a schematic view for explaining the structure of the partitioning member.
Figure 4D:
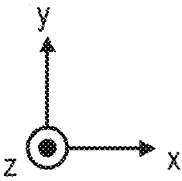

The first through-holes THa and the second through-holes THb formed in the partitioning member 40A are further described with reference to FIGS. 4A, 4B, 4C, and 4D. FIGS. 4A to 4D are schematic diagrams for explaining a structure of the partitioning member 40A. FIG. 4A is a schematic developed view of part (i.e. a portion forming one space Vu) of the partitioning member 40A. FIGS. 4B and 4C are schematic cross-sectional views of the partitioning member 40A. FIG. 4D is a schematic plan view of an apex 44 of the partitioning member 40A. The shapes of the first through-holes THa may be substantially rectangular shapes as shown in FIGS. 4A and 4C or may be substantially circular shapes as shown in FIGS. 2 and 3.

In the illustrated example, each of the plurality of walls 42 is inclined with respect to the principal surface 21*a* of the substrate 21 so that a cross-sectional area of a corresponding one of the spaces Vu becomes larger away from the principal surface 21*a* of the substrate 21. In this example, the side faces 41 of each of the plurality of walls 42 are in a trapezoidal shape. Each of the plurality of walls 42 may be perpendicular to the principal surface 21*a* of the substrate 21. In such a case, the side faces 41 of each of the plurality of walls 42 can be in a rectangular shape.

FIGS. 4B and 4C are referred to. Each of the first through-holes THa may be formed to include a point P located on a straight line L extending from a corresponding one of the light-emitting elements 22 in a direction in which the excitation light emitted from the light-emitting element 22 is highest in emission intensity. A length Ha of each of the first through-holes THa in the z direction is, for example, about half as great as a length HO of a corresponding one of the side faces 41 in the z direction, for example, preferably 30% or greater and 70% or less of the length HO. A length La of each of the first through-holes THa in the x direction is, for example, about half as great as a length Lp of a corresponding one of the side faces 41 in the x direction at a height Hp of the point P (i.e. at a distance from a corresponding one of the bottom faces 46 in the z direction), for example, preferably 40% or greater and 60% or less of the length Lp. Although FIGS. 4B and 4C show a first through-hole THa formed in a first side face 41*x*, a first through-hole THa can be similarly formed in a second side face 41*y*.

In the example shown in FIG. 4B, each of the light-emitting elements 22 has a batwing light distribution characteristic. In a case where each of the light-emitting elements 22 has a batwing light distribution characteristic, further improvement in luminance unevenness can be brought about by reducing the amount of light that is emitted to a position directly above the light-emitting element 22. In a broad sense, the batwing light distribution characteristic is defined by an emission intensity distribution that is high in emission intensity at an angle at which the absolute value of a light distribution angle is larger than 0 degree with an optical axis of the light-emitting element 22 being at 0 degree. In a narrow sense, the batwing light distribution characteristic is defined by an emission intensity distribution that is highest in emission intensity near 45 degrees or larger and 90 degrees or smaller. That is, the batwing light distribution characteristic is darker in a central portion than in an outer peripheral portion.

FIG. 4D is referred to. A length Lb in the x direction of a second through-hole THb formed in a first apex 44*x* may be equal to the length La of each of the first through-holes THa in the x direction. A length Wb in the y direction of the second through-hole THb formed in the first apex 44*x* is, for example, about half as great as a length WO of the first apex 44*x* in the y direction, for example, preferably 40% or greater and 60% or less of the length WO. Although FIG. 4D shows a second through-hole THb formed in a first apex 44*x*, a second through-hole THb can be similarly formed in a second apex 44*y*.

Figure 5A:
FIG. 5A is a schematic view showing another example of the shape of a first through-hole of the partitioning member.
Figure 5A:
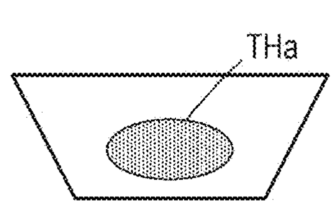
Figure 5B:
FIG. 5B is a schematic view showing another example of the shape of a first through-hole of the partitioning member.
Figure 5B:
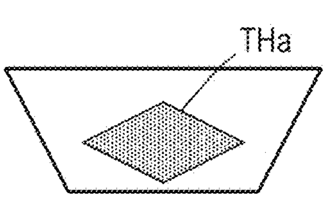
Figure 5C:
FIG. 5C is a schematic view showing another example of the shape of a first through-hole of the partitioning member.
Figure 5C:
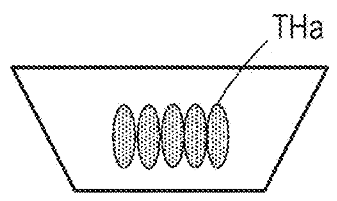
Figure 5D:
FIG. 5D is a schematic view showing another example of the shape of a first through-hole of the partitioning member.
Figure 5D:
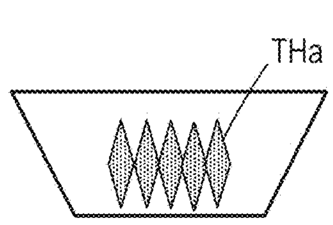

Other examples of the shapes of first through-holes THa are described with reference to FIGS. 5A, 5B, 5C, and 5D. FIGS. 5A to 5D are schematic plan views of side faces 41 for explaining other examples of the shapes of first through-holes THa. The shape of a first through-hole THa may be an ellipse as shown in FIG. 5A, may be a rhombus as shown in FIG. 5B, or may be any shape such as a circle or a polygon. Further, as shown in FIGS. 5C and 5D, a first through-hole THa may be constituted by a plurality of through-holes.

The shapes of first through-holes THa and second through-holes THb are not limited to those illustrated but can be any shapes.

Embodiment 2

Figure 6:
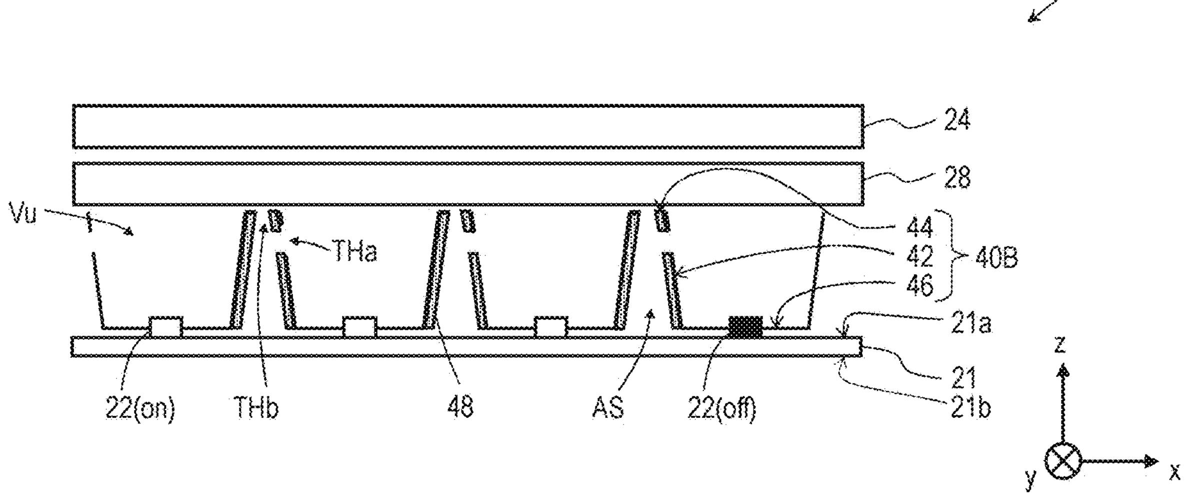
FIG. 6 is a cross-sectional view schematically showing a backlight device according to Embodiment 2 of the present disclosure.

A backlight device 50B according to the present embodiment is described with reference to FIG. 6. FIG. 6 is a cross-sectional view schematically showing the backlight device 50B according to Embodiment 2.

The backlight device 50B includes a partitioning member 40B differing from the partitioning member 40A of the backlight device 50A in that the partitioning member 40B further includes a light reflection layer 48 provided on the surfaces of the plurality of walls 42 that face the air gap AS.

In the backlight device 50B, a portion of the light emitted from the light-emitting elements 22 accommodated separately in each of the spaces Vu that has entered the air gap AS through the first through-holes THa can be reflected off a surface of the light reflection layer 48, pass through the second through-holes THb, which communicate with the first through-holes THa, and fall on the phosphor layer 24 via the diffuser panel 28.

As with the backlight device 50A, the backlight device 50B has an improved contrast ratio at the boundary between the glowing area Ron and the non-glowing area Roff and, at the same time, suppresses luminance unevenness attributed to a local reduction in luminance between adjacent unit areas LU. As with the display apparatus including the backlight device 50A, a display apparatus including the backlight device 50B has improved display quality.

Figure 7A:
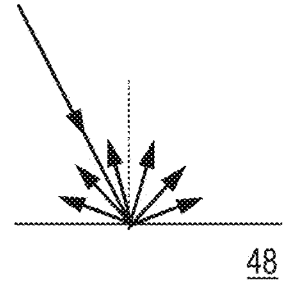
FIG. 7A is a schematic view for explaining a light reflection layer of the backlight device.
Figure 7B:
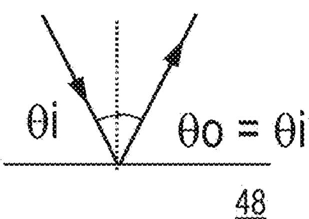
FIG. 7B is a schematic view for explaining the light reflection layer of the backlight device.

As in the case of the example shown in FIG. 7A, the light reflection layer 48 may have diffuse reflectiveness against the light emitted from the light-emitting elements 22, or as in the case of the example shown in FIG. 7B, the light reflection layer 48 may have specular reflectiveness against the light emitted from the light-emitting elements 22. In a case where the light reflection layer 48 has specular reflectiveness against the light emitted from the light-emitting elements 22, the luminance unevenness attributed to a local reduction in luminance between adjacent unit areas LU can be more effectively suppressed.

The backlight device 50B, which includes the light reflection layer 48, makes it unnecessary to from the partitioning member 40B from a member having diffuse reflectiveness. The backlight device 50B can provide a wider range of material choice than can the backlight device 50A.

As in the case of the modification shown in FIG. 1B, the backlight device 50B may further include an optical layer stack 30 placed at a side of the phosphor layer 24 that faces away from the diffuser panel 28.

Embodiment 3

Figure 8:
FIG. 8 is a cross-sectional view schematically showing a backlight device according to Embodiment 3 of the present disclosure.
Figure 8:
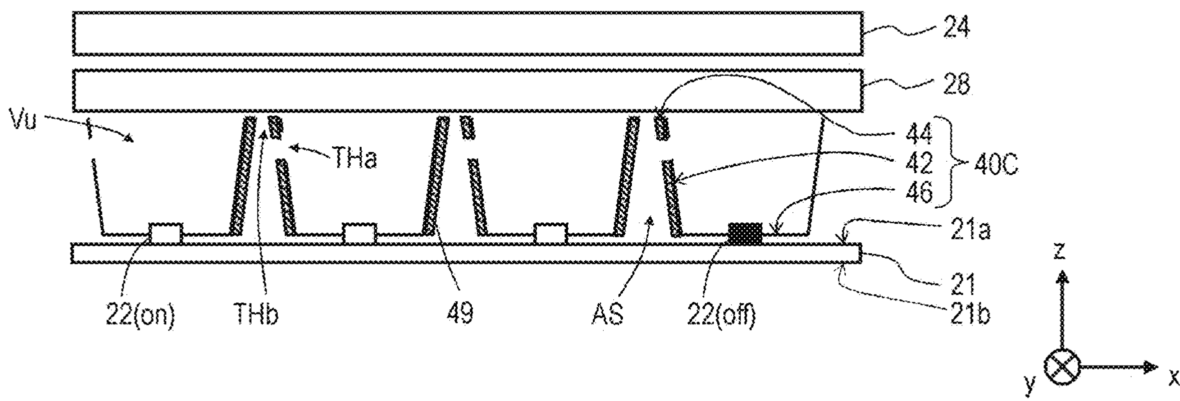

A backlight device 50C according to the present embodiment is described with reference to FIG. 8. FIG. 8 is a cross-sectional view schematically showing the backlight device 50C according to Embodiment 3.

The backlight device 50C includes a partitioning member 40C differing from the partitioning member 40A of the backlight device 50A in that the partitioning member 40C further includes a phosphor layer 49 (sometimes referred to as “second phosphor layer”) provided on the surfaces of the plurality of walls 42 that face the air gap AS. The phosphor layer 49 contains a phosphor that produces fluorescence by being excited upon receiving the excitation light emitted from the plurality of light-emitting elements 22. The phosphor layer 49 may have the same phosphor as the phosphor contained in the phosphor layer 24. For example, the phosphor layer 49 may contain a yellow phosphor that produces yellow fluorescence upon receiving the excitation light emitted from the plurality of light-emitting elements 22.

In the backlight device 50C, a portion of the light emitted from the light-emitting elements 22 accommodated separately in each of the spaces Vu that has entered the air gap AS through the first through-holes THa causes fluorescence (e.g. yellow light) to be produced from the phosphor layer 49. The fluorescence (e.g. yellow light) produced from the phosphor layer 49 can pass through the second through-holes THb, which communicate with the first through-holes THa, and fall on the phosphor layer 24 via the diffuser panel 28. The backlight device 50C allows the fluorescence (e.g. yellow light) produced from the phosphor layer 49 to be emitted toward the diffuser panel 28 and the phosphor layer 24 from the second through-holes THb provided in the apices 44 of the partitioning member 40C, thus suppressing luminance unevenness attributed to a local reduction in luminance between adjacent unit areas LU. In a case where yellow light is produced from the phosphor layer 49, the effect of suppressing luminance unevenness is great, as the yellow light makes a greater contribution to improvement in luminance than does, for example, blue light.

As in the case of the modification shown in FIG. 1B, the backlight device 50C may further include an optical layer stack 30 placed at a side of the phosphor layer 24 that faces away from the diffuser panel 28.

A backlight device according to an embodiment of the present disclosure makes it possible to suppress luminance unevenness. Using a backlight device according to an embodiment of the present disclosure makes it possible to reduce deterioration of the display quality of a display apparatus.

Embodiments of the present disclosure provide solutions described in the following items.

[Item 1]

A backlight device comprising:

a substrate having a principal surface;

a plurality of light-emitting elements, supported by the principal surface of the substrate, that emit excitation light;

a first phosphor layer containing a phosphor that produces fluorescence upon receiving the excitation light; and a partitioning member forming a plurality of spaces each of which accommodates any one or more of the plurality of light-emitting elements between the principal surface of the substrate and the first phosphor layer, wherein the partitioning member includes a plurality of walls each of which, in a top view, encloses the one or more of the plurality of light-emitting elements accommodated separately in each of the plurality of spaces, a plurality of apices each of which connects ones of the plurality of walls that are adjacent to each other, one or more first through-holes formed in the plurality of walls, and one or more second through-holes formed in the plurality of apices, an air gap is formed between adjacent two walls of the plurality of walls by the two walls and one of the apices that connects the two walls, and a second through-hole formed in the one of the apices among the one or more second through-holes communicates with a first through-hole formed in one of the two walls among the one or more first through-holes via the air gap.

[Item 2]

The backlight device according to Item 1, wherein each of the plurality of walls has a plurality of side faces that, in a top view, enclose in a rectangle shape the one or more of the plurality of light-emitting elements accommodated separately in each of the plurality of spaces.

[Item 3]

The backlight device according to Item 2, wherein the plurality of side faces includes a first side face constituting a side of the rectangle extending in a first direction in a top view, and a second side face constituting a side of the rectangle extending in a second direction intersecting the first direction in a top view, and two walls of the plurality of walls that are adjacent to each other in the first direction have second side faces that face each other via the air gap, one of which has at least one of the one or more first through-holes formed therein, and the other of which has none of the one or more first through-holes formed therein.

[Item 4]

The backlight device according to Item 3, wherein two walls of the plurality of walls that are adjacent to each other in the second direction have first side faces that face each other via the air gap, one of which has at least one of the one or more first through-holes formed therein, and the other of which has none of the one or more first through-holes formed therein.

[Item 5]

The backlight device according to any one of Items 1 to 4, wherein the plurality of apices includes a plurality of first apices extending in a first direction in a top view, and a plurality of second apices extending in a second direction intersecting the first direction in a top view, and the one or more second through-holes are not formed at points of intersection of the plurality of first apices and the plurality of second apices.

[Item 6]

The backlight device according to Item 5, wherein the plurality of apices is formed in a grid pattern including the plurality of first apices and the plurality of second apices in a top view.

[Item 7]

The backlight device according to any one of Items 1 to 6, wherein the plurality of apices includes flat portions that are substantially parallel to the principal surface of the substrate.

[Item 8]

The backlight device according to any one of Items 1 to 7, further comprising a diffuser panel placed between the first phosphor layer and the partitioning member.

[Item 9]

The backlight device according to Item 8, wherein the plurality of apices supports the diffuser panel.

[Item 10]

The backlight device according to any one of Items 1 to 9, wherein each of the one or more first through-holes is formed in an area including a point located on a straight line extending from a corresponding light-emitting element of the plurality of light-emitting elements in a direction in which the excitation light emitted from the corresponding light-emitting element is highest in emission intensity.

[Item 11]

The backlight device according to any one of Items 1 to 10, wherein each of the plurality of light-emitting elements has a batwing light distribution characteristic.

[Item 12]

The backlight device according to any one of Items 1 to 11, wherein the partitioning member further includes a light reflection layer provided on surfaces of the two walls that face the air gap.

[Item 13]

The backlight device according to Item 12, wherein the light reflection layer has specular reflectiveness against the excitation light.

[Item 14]

The backlight device according to any one of Items 1 to 11, wherein the partitioning member further includes a second phosphor layer provided on surfaces of the two walls that face the air gap, the second phosphor layer containing a phosphor that produces fluorescence upon receiving the excitation light.

[Item 15]

The backlight device according to Item 14, wherein the second phosphor layer contains a yellow phosphor that produces yellow fluorescence upon receiving the excitation light.

[Item 16]

A display apparatus comprising:

a display panel; and the backlight device according to any one of Items 1 to 15, wherein the backlight device emits light toward a back face of the display panel.

The present disclosure contains subject matter related to that disclosed in Japanese Priority Patent Application JP 2024-107933 filed in the Japan Patent Office on Jul. 4, 2024, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A backlight device comprising:

a substrate having a principal surface;

a plurality of light-emitting elements, supported by the principal surface of the substrate, that emit excitation light;

a first phosphor layer containing a phosphor that produces fluorescence upon receiving the excitation light; and a partitioning member forming a plurality of spaces each of which accommodates any one or more of the plurality of light-emitting elements between the principal surface of the substrate and the first phosphor layer, wherein the partitioning member includes a plurality of walls each of which, in a top view, encloses the one or more of the plurality of light-emitting elements accommodated separately in each of the plurality of spaces, a plurality of apices each of which connects ones of the plurality of walls that are adjacent to each other, one or more first through-holes formed in the plurality of walls, and one or more second through-holes formed in the plurality of apices, an air gap is formed between adjacent two walls of the plurality of walls by the two walls and one of the apices that connects the two walls, and a second through-hole formed in the one of the apices among the one or more second through-holes communicates with a first through-hole formed in one of the two walls among the one or more first through-holes via the air gap.

2. The backlight device according to claim 1, wherein each of the plurality of walls has a plurality of side faces that, in a top view, enclose in a rectangle shape the one or more of the plurality of light-emitting elements accommodated separately in each of the plurality of spaces.

3. The backlight device according to claim 2, wherein the plurality of side faces includes a first side face constituting a side of the rectangle extending in a first direction in a top view, and a second side face constituting a side of the rectangle extending in a second direction intersecting the first direction in a top view, and two walls of the plurality of walls that are adjacent to each other in the first direction have second side faces that face each other via the air gap, one of which has at least one of the one or more first through-holes formed therein, and the other of which has none of the one or more first through-holes formed therein.

4. The backlight device according to claim 3, wherein two walls of the plurality of walls that are adjacent to each other in the second direction have first side faces that face each other via the air gap, one of which has at least one of the one or more first through-holes formed therein, and the other of which has none of the one or more first through-holes formed therein.

5. The backlight device according to claim 1, wherein the plurality of apices includes a plurality of first apices extending in a first direction in a top view, and a plurality of second apices extending in a second direction intersecting the first direction in a top view, and the one or more second through-holes are not formed at points of intersection of the plurality of first apices and the plurality of second apices.

6. The backlight device according to claim 5, wherein the plurality of apices is formed in a grid pattern including the plurality of first apices and the plurality of second apices in a top view.

7. The backlight device according to claim 1, wherein the plurality of apices includes flat portions that are substantially parallel to the principal surface of the substrate.

8. The backlight device according to claim 1, further comprising a diffuser panel placed between the first phosphor layer and the partitioning member.

9. The backlight device according to claim 8, wherein the plurality of apices supports the diffuser panel.

10. The backlight device according to claim 1, wherein each of the one or more first through-holes is formed in an area including a point located on a straight line extending from a corresponding light-emitting element of the plurality of light-emitting elements in a direction in which the excitation light emitted from the corresponding light-emitting element is highest in emission intensity.

11. The backlight device according to claim 10, wherein each of the plurality of light-emitting elements has a batwing light distribution characteristic.

12. The backlight device according to claim 1, wherein the partitioning member further includes a light reflection layer provided on surfaces of the two walls that face the air gap.

13. The backlight device according to claim 12, wherein the light reflection layer has specular reflectiveness against the excitation light.

14. The backlight device according to claim 1, wherein the partitioning member further includes a second phosphor layer provided on surfaces of the two walls that face the air gap, the second phosphor layer containing a phosphor that produces fluorescence upon receiving the excitation light.

15. The backlight device according to claim 14, wherein the second phosphor layer contains a yellow phosphor that produces yellow fluorescence upon receiving the excitation light.

16. A display apparatus comprising:

a display panel; and the backlight device according to claim 1, wherein the backlight device emits light toward a back face of the display panel.

* * * * *